United States Patent [19]

Scheve

[11] 4,306,012
[45] Dec. 15, 1981

[54] PROCESS OF RADIATION AND HEAT TREATMENT OF PRINTING MEDIUM

[75] Inventor: Bernard J. Scheve, Wilmington, Del.

[73] Assignee: Hercules Incorporated, Wilmington, Del.

[21] Appl. No.: 217,975

[22] Filed: Dec. 19, 1980

Related U.S. Application Data

[63] Continuation-in-part of Ser. No. 100,609, Dec. 5, 1979, abandoned.

[51] Int. Cl.³ .......................... B05D 3/08; G03C 7/00
[52] U.S. Cl. .................................... 430/296; 427/226; 430/285; 430/288; 430/322; 430/330; 430/350; 430/394; 430/300; 430/308
[58] Field of Search ............... 430/288, 917, 285, 296, 430/300, 308, 322, 330, 350, 394; 427/226

[56] References Cited

U.S. PATENT DOCUMENTS

| | | | |
|---|---|---|---|
| 2,892,734 | 6/1959 | Hoffman | 117/46 |
| 3,573,908 | 4/1971 | Minetti | 96/34 |
| 3,615,457 | 10/1971 | Seibert et al. | 96/35.1 |
| 3,644,120 | 2/1972 | Kai et al. | 430/917 |
| 3,661,576 | 5/1972 | Crary | 96/35.1 |
| 3,794,494 | 2/1974 | Kai et al. | 96/35.1 |
| 3,876,432 | 4/1975 | Carlick et al. | 96/115 P |
| 3,982,941 | 9/1976 | Inskip | 96/34 |
| 4,064,287 | 12/1977 | Lipson et al. | 427/53 |
| 4,113,592 | 9/1978 | Rybny et al. | 204/159.16 |
| 4,188,222 | 2/1980 | Nezu et al. | 430/284 |

*Primary Examiner*—Jack P. Brammer
*Attorney, Agent, or Firm*—Marion C. Staves

[57] ABSTRACT

A radiation curable printing medium suitable for screen printing on glass, metal and ceramics which is to be cured and subsequently fired, comprising (a) 4 to 25% by weight of a polymerizable, liquid prepolymer containing at least about two ethylenically unsaturated end groups;
(b) 4 to 15% by weight of at least one ethylenically unsaturated polymerizable monomer containing a polar functional group;
(c) 60 to 90% by weight of a ceramic frit; and
(d) 0.02 to 2% by weight of a polymerization inhibitor.

3 Claims, No Drawings

PROCESS OF RADIATION AND HEAT TREATMENT OF PRINTING MEDIUM

This application is a continuation-in-part of my co-pending application Ser. No. 100,609, filed Dec. 5, 1979 and now abandoned.

This invention relates to the preparation of novel ceramic coating compositions. More specifically, it relates to electron beam or ultraviolet light polymerizable screen printing media containing ceramic frits.

According to the current state of the art, ceramic frits are mixed with vehicles consisting of wax, low molecular weight polymers or other low melting solid materials to form screen printing media. For application to a heat resistant glass or metal substrate, the composition is liquefied by means of heat or solvents or a combination of heat and solvents and applied by screen printing. After application of the composition to a workpiece, the workpiece is fired at about 525° to 825° C. to fuse the glass frit to the workpiece and simultaneously burn off the vehicle.

While the method employed in the art today has been generally satisfactory, it is subject to objection due to the fact that both the printing screens and the workpiece must be heated prior to the printing operation. Moreover, the use of solvents in the screen printing media is environmentally troublesome and sometimes hazardous while adding an extra element of cost to the process. Accordingly, it is the object of this invention to provide a solvent-free, screen printable, coating composition containing ceramic frits which can be applied at room temperature to a workpiece and fired in a conventional manner. It is a further object to provide a coating composition having desirable viscosity before irradiation and a low enough crosslink density after irradiation so as not to interfere with removal of the vehicle on firing.

The coating compositions of this invention make use of a binder or vehicle comprised of a liquid, unsaturated prepolymer and an ethylenically unsaturated monomer at least part of which contains a polar group. The vehicle is a liquid which is polymerizable under the influence of ultraviolet light or an electron beam to a solid or semi-solid, non-flowable condition to permit the workpiece to be cut, trimmed, washed, or brushed as necessary prior to being fired to burn it off and fuse the frit. Specifically, the novel coating compositions of this invention are comprised of:

(a) 4 to 25% by weight of a polymerizable, liquid prepolymer containing at least two and preferably not more than five ethylenically unsaturated end groups;

(b) 4 to 15% by weight of at least one ethylenically unsaturated polymerizable monomer containing a polar functional group;

(c) 60 to 90% by weight of a ceramic frit; and (d) 0.02 to 2% by weight of a polymerization inhibitor.

It is critical to the invention that both the liquid terminally unsaturated prepolymer and the ethylenically unsaturated monomer be present. Addition of the frit to either the ethylenically unsaturated monomer alone or to the unsaturated prepolymer alone results in very dry pasty compositions which are difficultly, if at all, spreadable. Such compositions are impossible to apply by screen printing techniques and, due to their dryness and viscosity, are unsatisfactory when application is attempted by other methods. Moreover, compositions based on liquid unsaturated prepolymers and nonfunctional monomers, as defined hereinafter, are likewise mostly dry, unspreadable pastes.

The liquid, unsaturated prepolymers used in this invention comprise hydroxyl terminated polyester, polyether or polyester-polyether backbones modified to contain the requisite terminal unsaturation. Such modification is usually effected by way of the hydroxyl group as will be explained hereinafter. Most preferably the number average molecular weight of the prepolymers will be from about 15,000 to about 80,000.

Hydroxyl terminated polyesters (also called polyester diols) can be prepared by conventional processes such as direct esterification, ester exchange or addition reaction between an excess of an alcoholic component comprising at least one polyol and an acidic component comprising at least one dicarboxylic acid or the anhydride and/or dimethyl or diethyl ester thereof. Preparation of such polyesters is described in, e.g., U.S. Pat. No. 3,812,063.

Exemplary dicarboxylic acids or anhydrides and methyl or ethyl esters thereof which can be utilized for the preparation of polyester prepolymer backbones can be either saturated or unsaturated. To obtain the desired results, in general, no more than 10 mole % of the dicarboxylic acids will be unsaturated. Useful unsaturated acids include maleic acid, fumaric acid, citraconic acid, mesaconic acid, itaconic acid, glutaconic acid, muconic acid and aconitic acid. Examples of useful saturated dicarboxylic acids, anhydrides and methyl or ethyl esters thereof which can be used include oxalic acid, malonic acid, succinic acid, glutaric acid, adipic acid, pimelic acid, suberic acid, azelaic acid, sebacic acid, methyl malonic acid, methyl succinic acid, phthalic acid, isophthalic acid and terephthalic acid.

Examples of suitable diols which may be included in the polyesters are ethylene glycol, 1,2-propylene glycol, 1,3-propanediol, 1,4-butanediol, diethylene glycol, dipropylene glycol, polyethylene glycols having an average molecular weight of at least about 150, polypropylene glycols having an average molecular weight of at least about 192, polybutylene glycols having an average molecular weight of at least about 162 and copoly(oxyethyleneoxypropylene) glycols having an average molecular weight of at least about 120. In order to improve the mechanical strength of the polyester prepolymers, various polyols having 3 or more functional groups can also be used in addition to the diols. In general, not more than 10 mole % of the polyols will have 3 or more functional groups. Exemplary polyols include glycerol, trimethylolpropane, erythritol, pentaerythritol, hexitol, and the like.

The hydroxyl terminated polyesters can be modified by having their chain lengths extended through reaction with a diisocyanate, forming an isocyanate terminated polyesterpolyurethane. When utilized, the diisocyanate is employed in about 1.1-1.5:1 molar ratio relative to starting polyester.

The diisocyanates employed to form the isocyanate terminated polyester-urethanes include 2,4-tolylene diisocyanate, phenylene diisocyanate, 3,3'-bis-tolylenemethane, 4,4'-diisocyanate, metaphenylene diisocyanate, 4,4'-biphenylene diisocyanate, 4,4'-biphenylenemethane diisocyanate, xylene diisocyanate, 1,4-naphthylene diisocyanate, 1,5-naphthylene diisocyanate, 1,4-tetramethylene diisocyanate, 1,6-hexamethylene diisocyanate, 1,10-decamethylene diisocyanate, octadecyl diisocyanate, 1,4-cyclohexyl diisocyanate, 4,4'-methylene-bis(cyclohexyl isocyanate), 1,5-tetrahydronaphthylene diisocyanate, tolylene-diisocyanate dimers, and the like.

The reaction between the hydroxyl terminated polyester and the diisocyanate is carried out at a temperature of about 50° C. to 150° C. for about 60 to 300 minutes in air or an inert gas atmosphere such as nitrogen gas in the presence or absence of a catalyst. The catalysts include tertiary amines such as diethylcyclohexylamine and triethylenediamine, and organo-heavy-metal compounds soluble in the reaction system such as ferrous acetoacetate, dibutyltin dilaurate, stannous oleate and stannous octoate.

To convert the hydroxyl terminated polyester into a terminally unsaturated prepolymer suitable for use in this invention, the hydroxyl-terminated polyester can be reacted with a carboxylic acid or its acid chloride having vinyl unsaturation. Exemplary of such carboxylic acids are acrylic acid, methacrylic acid, and itaconic acid or the anhydrides or acid halides thereof.

It is preferred, however, to extend the polyester chain initially with a diisocyanate as taught hereinabove prior to reaction to add the terminal vinyl unsaturation. The isocyanate terminated polyester-urethane can then be reacted with an alcohol, an amine, or carboxylic acid containing vinyl unsaturation.

Examples of suitable alcohols containing terminal vinyl unsaturation include 2-hydroxyethyl acrylate or methacrylate, 2-hydroxypropyl acrylate or methacrylate, 3-bromo-2-hydroxypropyl acrylate or methacrylate, 3-chloro-2-hydroxypropyl acrylate or methacrylate, 4-hydroxy-n-butyl acrylate or methacrylate, diethylene glycol monoacrylate or monomethacrylate, dipropylene glycol monoacrylate or monomethacrylate, dibutylene glycol monoacrylate or methacrylate, tetraethylene glycol monoacrylate or methacrylate, monoacrylates or methacrylates of polyoxyethylene diols having a number average molecular weight of about 200 to 900, monoacrylates or monomethacrylates of polyoxypropylene diols having a number average molecular weight of about 200 to 1,200 and monoacrylates or monomethacrylates of polyoxybutylene diols having a number average molecular weight of about 200 to 1,500, 3-bromo-2-hydroxypropyl acrylate or methacrylate, 3-chloro-2-hydroxypropyl acrylate or methacrylate and

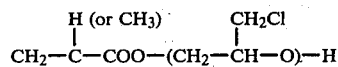

Examples of suitable vinyl amines are allylamine and diallylamine.

Examples of suitable vinylically unsaturated carboxylic acids are acrylic acid, methacrylic acid and itaconic acid.

Hydroxyl terminated polyethers (polyether diols) which can form the backbone of the prepolymer employed in this invention are known, commercially available materials. Exemplary of such polyether diols are, e.g., polyethylene glycols of about 200 to 6,000 molecular weight, polypropylene glycols of similar degree of polymerization, poly(ethylene oxides), and poly(propylene oxide) polymers and copolymers. Terminally unsaturated prepolymers suitable for use in the compositions of this invention are prepared from the hydroxyl terminated polyether diols in the same manner as has been described for the hydroxyl terminated polyesters.

Preparation of this type of prepolymer is described generally in U.S. Pat. No. 4,057,431.

Hydroxyl terminated polyester-polyethers are urethane linked block polymers of polyester diols, triols or tetraols and polyether diols, polyether triols or polyether tetraols. Any polyester diol and any polyether diol of the type previously described can be urethane linked to form these block polymers. Such block polymers are then converted to terminally unsaturated prepolymers in the manner described for the other types of prepolymers. This type of polymer and its conversion to a suitable prepolymer are described in U.S. Pat. No. 3,960,572. This patent also sets forth a more complete description of the urethane bonding technique and is incorporated herein by reference.

Incomplete conversion of the hydroxyl terminated prepolymer to one containing terminal unsaturation may sometimes result in the prepolymer containing somewhat less than two ethylenically unsaturated end groups. Because of this, applicant uses the term "at least about two ethylenically unsaturated end groups" in the specification and claims.

The ethylenically unsaturated polar monomers are represented by materials of the structure:

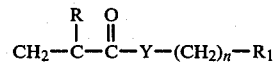

where R is hydrogen or a methyl group; Y is —O— or

n=1–10; $R_1$ is a polar group such as, e.g., epoxy, carboxy, hydroxy, amino, substituted amino; alkoxyl, polyoxyalkylene; aryloxy;

where $R_2$ is a $C_1$–$C_3$ alkyl group,

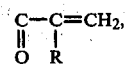

and aryl group of 6–10 carbon atoms; or

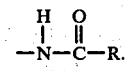

Examples of suitable compounds include 2-hydroxyethyl acrylate, 2-hydroxyethyl methacrylate, 2-hydroxypropyl acrylate, 2-hydroxypropyl methacrylate, 3-chloro-2-hydroxypropyl acrylate, 3-chloro-2-hydroxypropyl methacrylate, 4-hydroxybutyl acrylate, 4-hydroxybutyl methacrylate, diethyleneglycol monoacrylate, diethyleneglycol monomethacrylate, dipropyleneglycol monoacrylate, dipropyleneglycol monomethacrylate, polyethyleneglycol (average molecular weight: about 150 to 200) monoacrylate, polyethyleneglycol (average molecular weight: about 150 to 200) monoethacrylate, polypropyleneglycol (average molecular weight: 150 to 200) monoacrylate; polypropyleneglycol (average molecular weight): about 150 to 200) monomethacrylate; N-methyl-2-hydroxypropylmethacroyl carbamate, diacetone acrylamide; N-methylolacrylamide; and N-ethylolacrylamide.

Other suitable polar monomers of various types are based on the structure:

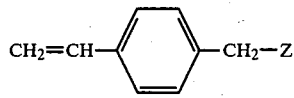

where Z is OH,

or the like. Representative of such compounds are p-vinylbenzyl alcohol, p-vinylbenzylamine, allyl alcohol, p-phenoxyethylbenzyl styrene, and the like.

Monomers which are classified as weakly polar or somewhat hydrophilic which may be used in place of the more polar or functional monomers are based on the allyl structure. Representative of such monomers are allyl alcohol, glycerol diallyl ether, trimethylolpropane diallyl ether, and allylvinyl carbinol. Vinyl acetate belongs to the group of weakly polar monomers. Also classified here are monomers such as cellosolve acrylate and tetrahydrofuran acrylate.

Examples of suitable other ethylenically unsaturated compounds which may be used in conjunction with the above polar or functional monomers include methyl acrylate, ethyl acrylate, n-propyl acrylate, isopropyl acrylate, n-hexyl acrylate, n-octyl acrylate, n-dodecyl acrylate, cyclohexyl acrylate, allyl acrylate, styrene, vinyltoluene, divinylbenzene, diallylphthalate, triallylcyanurate, and the like.

For the purpose of inhibiting premature cross-linking during thermal processing and storage of the photopolymer compositions of this invention, the incorporation of a thermal polymerization inhibitor or inhibitors is desirable. Such inhibitors also are well known in the art, and they are exemplified by di-t-butyl-p-cresol, hydroquinone monomethyl ether, pyrogallol, quinone, hydroquinone, methylene blue, t-butyl catechol, hydroquinone monobenzyl ether, methyl hydroquinone, amyl quinone, amyloxy hydroquinone, n-butyl phenol, phenol, hydroquinone monopropyl ether, phenothiazine and nitrobenzene, used separately or in combination. When used in an amount within the range of from about 0.01 to 2% by weight of the polymer, these inhibitors are quite effective in preventing cross-linking of the photopolymer composition during processing and storage.

Ceramic frits useful in the invention are known commercial products consisting of high temperature stable inorganic compounds in specially designed glasses. Typical inorganic compounds employed in the ceramic frits are heavy metal oxides such as ferric oxides, titanium dioxide, chromium oxide, zinc oxide, magnesium dioxide, alumina, cobalt oxide, and cadmium oxide. Certain silicates such as praseodymium and zirconium silicate are also useful. These materials are well known and will be immediately apparent to the practitioner. In general, the frits will be irregular shaped particles having diameters of about 40 to about 75 microns.

In addition to the specified, required components, the compositions can optionally also contain other components such as, e.g., photoinitiators, wetting agents for the pigments, leveling agents such as, e.g., waxes or polyalkylene glycols, and cure rate promoters.

The photosensitizers which can be used in the compositions of this invention are generally well known. They are compounds which absorb actinic light very strongly and, thus, become activated to the point where they will abstract hydrogen atoms from compounds which are hydrogen donors. By doing so, the photosensitizer is itself reduced and the hydrogen donor is converted into a free radical. Other compounds known as photoinitiators absorb actinic light and become activated to a point such that they decompose into several free radicals. Representative compounds are benzophenone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl- benzophenone, benzoin, isobutyl ether, benzoic acetate, benzil, benzilic acid, methylene blue, acetophenone, 2,2-diethoxyacetophenone, 9,10-phenanthrenequinone, 2-methyl anthraquinone, 2-ethyl anthraquinone, 1-tert-butyl-anthraquinone and 1,4-naphthoquinone. Particularly suitable are 2,2-diethoxyacetophenone, 2,2-dimethoxy-2-phenylacetophenone, benzoin isopropyl ether, benzoin isobutyl ether, and 2-ethyl anthraquinone. Also applicable are combinations of carbonyl sensitizer compounds and certain organic amine activators as disclosed in U.S. Pat. No. 3,759,807. In general, the photoinitiator should be thermally stable at temperatures up to about 100° C. Stability at such temperatures prevents premature cross-linking when the compositions of the invention are prepared or during storage. The amount of photoinitiator can be from about 0.05 to 10%, preferably from about 2 to about 12% by weight, based on the polymer in the photopolymer composition.

The coating compositions of the invention are applied to the substrate by techniques conventionally used to apply coatings to glass, metal or ceramic substrata but in particular by screen printing techniques wherein the composition is forced onto a workpiece through a screen. The raw composition, as applied, has sufficient shape retentiveness that it does not run at room temperature but not sufficient that freshly coated substrata can be handled. To set or cure the coating in the desired region, it is subjected to ultraviolet radiation, pulsed beam ultraviolet radiation or to electron beam radiation.

Since the organic vehicle is to be burned off during the firing step, it is not necessary that a complete cure be effected. While a complete cure is not harmful or does not hinder the burn-off of the vehicle, all that is actually required is that sufficient curing be effected to set up the vehicle to a condition in which it can be handled in subsequent operations without damaging the design applied to the workpiece. To this end, a radiation intensity of about 1 to 15 Mrad for electron beam curing, or 15–50 Mwatt/cm$^2$ in continuous UV curing, or $1 \times 10^3$–$10^6$ watts in pulsed curing systems is usually sufficient.

The firing step is carried out at a temperature between about 500° and 900° C. in order to fuse the glass frit to the workpiece. The compositions of this invention flow out evenly to form a glossy smooth coating which adheres well to glass or metal. The cured vehicle burns off completely at the firing temperature, leaving no undesirable ash or other residue.

This invention is illustrated by the following examples in which all parts are by weight unless otherwise noted.

EXAMPLE 1

A polyester-polyether urethane-linked block copolymer (I) was prepared by reacting 26.1 g. of a mixture of 2,4-toluene diisocyanate and 2,6-toluene diisocyanate (in an 80/20 weight ratio, respectively) under nitrogen with 200 g. of a hydroxyl terminated polyethylene adipate (molecular weight approximately 450) at 70° C. with stirring in the presence of 0.1 g. dibutyltin dilaurate for 2 hours. The resulting isocyanate terminated polyester is further reacted with 100 g. of hydroxyl terminated polypropylene glycol (molecular weight approximately 1000) at 70° C. for 2 hours. Then 300 g. of the resulting polyester-polyether urethane-linked block polymer (I) is reacted at 70° C. for 2 hours under an air sparge with 25 g. of 2-hydroxypropylmethacrylate containing 0.09 g. of 2,6-di-tert-butyl-p-cresol as stabilizer.

To 66 parts of this prepolymer was added 7 parts ethylhexyl acrylate, 13 parts cellosolve acrylate, 7 parts hydroxypropyl acrylate, 7.8 parts alpha,alpha-dimethoxyphenylacetophenone, 0.1 part 2,6-di-tert-butyl-p-cresol and 0.1 part monomethyl ether of hydroquinone. To one part of this composition was added 3 parts gray ceramic frit. A $1'' \times 2\frac{1}{2}'' \times 0.001$–$0.0015''$ strip was printed onto a glass slide with the use of a 160-mesh screen. The coating was cured with actinic light from a medium pressure mercury arc at an intensity of 50 mw/cm.$^2$ at a distance of 2 inches for 60 seconds. The resulting cured pigmented coating was fired in a kiln at about 593° C. for 10 minutes and the ceramic frit was fused to the glass and the coating had a smooth, glossy finish.

EXAMPLE 2

Fifty-seven parts of the prepolymer described in Example 1 was added to 14 parts isodecyl acrylate, 14 parts phenoxyethyl acrylate, and 1 part 2,6-di-tert-butyl-p-cresol and 13.8 parts alpha-benzoin methyl ether. One (1) part of this mixture was added to 3 parts of black ceramic frit. The resulting ink was screened onto a glass plate and the $1'' \times 2\frac{1}{2}'' \times 0.0001$–$0.0015''$ sample was cured with a 170 kw electron beam unit at 20 feet per minute under nitrogen at a dose of three megarads. A smooth glossy coating was obtained after firing at 593° C.

EXAMPLE 3

To 74 parts of the prepolymer described in Example 1 was added 6.4 parts hydroxypropoxyl methacrylate, 4.7 parts lauryl methacrylate, 4.7 parts N-vinylpyrrolidone, 9 parts benzoin isobutyl ether, 0.1 part 2,6-di-tert-butyl-p-cresol and 1.5 part rosin amine. To 1 part of this resin was added 5 parts gray ceramic frit. A $1'' \times 2\frac{1}{2}'' \times 0.0015$–$0.002''$ coating was screened onto glass and cured with an electron beam unit as described in Example 2. The cured sample was washed with water and brushed lightly with a nylon bristle brush. Subsequent fire-out gave an adequate coating.

EXAMPLE 4

A polyester resin was prepared from 37 parts diethylene glycol, 13 parts propylene glycol, 35 parts adipic acid, 15 parts isophthalic acid. The condensation was carried to an acid number of 37. To 100 parts of this polymer was added 12.3 parts glycidyl methacrylate, 0.22 part benzyldimethylamine, 0.01 part phenothiazine, and 0.26 part di-tert-butyl-p-cresol. This mixture was heated at 80° C. under air until acid number of less than 2 was obtained. To 50 parts of this polyester prepolymer was added 50 parts of hydroxypropyl methacrylate and 0.01 part di-tert-butyl-p-cresol. Then one part of this resin was added to 4 parts black ceramic frit. This material screen printed onto glass excellently through a 100–mesh screen to give a $1'' \times 2\frac{1}{2}'' \times 0.0015$–$0.002''$ coating. The coating was cured at 170 kev with an electron beam unit at 20 feet per minute under nitrogen at a dose of 1 megarad. One-half of this material was washed with water and brushed with a nylon brush. Both the unwashed and washed samples were fired at 593° yielding a glossy ceramic coating.

EXAMPLE 5

A polyether urethane-linked polymer was prepared by reacting 400 parts of a polyol (hydroxyl #106 mw 530) prepared from ethylene and propylene oxides with 264 parts of a mixture of 2,4- and 2,6-toluene diisocyanate (in an 80/20 weight ratio) under nitrogen at 70° C. with stirring in the presence of 0.1 g. dibutyltin dilaurate for 2 hours. This material was then reacted at 70° C. for two hours under an air sparge with 328 parts of hydroxyethyl methacrylate containing 0.09 part of 2,6-di-tert-butyl-p-cresol as stabilizer. To 66 parts of this prepolymer was added 13 parts cellosolve acrylate, 21 parts ethylhexyl acrylate, 0.1 part 2,6-di-tert-butyl-p-cresol and 0.1 part monomethylether of hydroquinone. To one part of this composition was added 3 parts black ceramic frit. This material was screen printed onto a copper plate and cured for 5 seconds by exposure to a pulsed xenon light system. The sample, when fired at 593° C. for 10 minutes, produced a glossy ceramic coating.

EXAMPLE 6

Into a one-liter, three-necked flask maintained under a nitrogen atmosphere and equipped with a stirrer, a thermometer, a dropping funnel, a gas sparge tube and a gas outlet tube was charged a polyol (hydroxyl #105 mw 535) prepared from adipic acid and diethylene glycol. This material was reacted with 338 parts of isophorone diisocyanate under nitrogen at 70° C. with stirring in the presence of 0.1 g. dibutyltin dilaurate for 2 hours. The material was reacted at 70° C. for two hours under an air sparge with 328 parts hydroxyethyl methacrylate containing 0.09 part 2,6-di-tert-butyl-p-cresol as stabilizer.

To 50 parts of this prepolymer were added 17 parts ethylhexyl acrylate, 20 parts cellosolve methacrylate, 13 parts hydroxypropyl methacrylate, 0.1 part 2,6-di-tert-butyl-p-cresol and 0.1 part monomethylether of hydroquinone. To 1 part of the resin was added 3 parts of black ceramic frit. A $1'' \times 2\frac{1}{2}'' \times 0.0015$–$0.002''$ sample was screened onto a ceramic surface. The sample was cured as described in Example 1 and the resulting cured coating was fired at 801° C. for 10 minutes and gave a glossy ceramic coating.

EXAMPLE 7

To a resin kettle equipped with a mechanical stirrer, thermometer, a temperature control, a nitrogen/dry air sparge tube and an off gas line connected to a cold water trap was charged 1968.4 g. of an adipic acid-propylene glycol polyester polyol and 1547.5 g. of a block copolymer of propylene and ethylene glycols. The mixture was heated to 80° C. and sparged for sixteen hours with dry nitrogen to remove water. The mixture was cooled to 60° C. and 510 ml. of isophorone diisocyanate was added. After stirring at 80° C. for one and a half hours, a small amount of dibutyl tin dilaurate (3.11 g.) was added. The mixture exothermed to 95° C. and was allowed to cool back to 80° C. for 1 hour. When the isocyanate concentration, as evidenced by JR analysis, reached 1.76%, the nitrogen sparge was replaced with a dry air sparge to allow the inhibitor to function. At 1.63% isocyanate concentration, 850.4 g. of hydroxypropyl methacrylate was added together with 5 g. of butylated hydroxytoluene. The reaction was then allowed to continue at 80° C. until the isocyanate concentration became negligible.

To 100 g. of the above described prepolymer was added 40 g. of hydroxypropyl methacrylate, 40 g. of trimethylolpropane trimethacrylate, 16 g. of vinyl acetate, 0.2 g. of butylated hydroxytoluene and 0.1 g. of monomethyl ether of hydroquinone. This vehicle was blended in a 1:3 ratio with a black ceramic frit on a three-roll mill to afford the final coating.

This coating was printed using an 8-mesh screen onto a glass panel and cured with 4 Mrad at 22 ft./min. to afford a dry coating. Subsequent burn-out in an autoclave at 1160° F. for five minutes afforded a satisfactory colored coating.

EXAMPLE 8

An oligomer was prepared as in Example 7, substituting an equivalent amount of toluene diisocyanate for the isophorone diisocyanate. This material (100 g.) was then blended with 60 g. of hydroxypropyl methacrylate, 60 g. of trimethylolpropane trimethacrylate, 20 g. of methacrylic acid, 1.2 g. of isooctylthioglycolate, 0.24 g. of butylated hydroxytoluene and 0.12 g. of methyl ether hydroquinone.

Blending the vehicle with a black ceramic frit in a 1:3 on a three-roll mill afforded the final coating. This was screen printed onto a glass panel and cured with a 4 Mrad dose at 33 ft./min. on an electron beam unit. The resulting cured coating was fired out as in Example 1 to afford a very acceptable glass coating.

What I claim and desire to protect by Letters Patent is:

1. In the process of coating a heat resistant substrate selected from glass, metal and ceramic comprising the steps of
    (1) applying a solvent-free printing medium to the heat resistant substrate, wherein the printing medium comprises a ceramic frit and a vehicle therefor;
    (2) curing the printing medium with ultraviolet radiation, pulsed beam ultraviolet radiation or electron beam radiation after it is applied to the substrate; and
    (3) thereafter firing the substrate with the applied and cured printing medium at a temperature sufficient to burn off the vehicle and fuse the frit to the substrate; the improvement wherein the printing medium is a composition comprised of
        (a) about 2% to 25% by weight of a polymerizable liquid prepolymer comprising hydroxyl terminated polyester, polyether or polyester-polyether backbones containing at least about two ethylenically unsaturated end groups and having a number average molecular weight of from about 15,000 to about 80,000;
        (b) about 2 to 15% by weight of at least one ethylenically unsaturated, polymerizable monomer selected from acrylate and methacrylate containing a polar functional group;
        (c) about 60 to 90% by weight of a ceramic frit; and
        (d) about 0.02 to 2% by weight of a polymerization inhibitor.

2. In the process of claim 1 wherein the printing medium is applied to the substrate by screen printing techniques.

3. In the process of claim 2 wherein the printing medium is applied to the substrate to form an image thereon.

* * * * *